(12) United States Patent
Walker et al.

(10) Patent No.: US 7,340,515 B2
(45) Date of Patent: Mar. 4, 2008

(54) OPTIMISATION OF NETWORK CONFIGURATION

(75) Inventors: Lee A Walker, Watford (GB); Simon P Valentine, Hemel Hempstead (GB); Christopher R Linzell, St Albans (GB); Richard J Artes, Kings Langley (GB)

(73) Assignee: 3Com Corporation, Marlborough, MA (US)

( * ) Notice: Subject to any disclaimer, the term of this patent is extended or adjusted under 35 U.S.C. 154(b) by 563 days.

(21) Appl. No.: 09/901,010

(22) Filed: Jul. 10, 2001

(65) Prior Publication Data

US 2002/0120731 A1 Aug. 29, 2002

(30) Foreign Application Priority Data

Feb. 27, 2001 (GB) .................................. 0104833.9

(51) Int. Cl.
*G06F 15/173* (2006.01)
*G06F 7/00* (2006.01)
*H04L 12/28* (2006.01)
*H04L 5/14* (2006.01)

(52) U.S. Cl. ...................... 709/224; 370/254; 370/276; 707/3

(58) Field of Classification Search ................ 717/171; 709/224; 370/254, 276; 707/1, 3
See application file for complete search history.

(56) References Cited

U.S. PATENT DOCUMENTS

| | | | | |
|---|---|---|---|---|
| 5,610,903 A | * | 3/1997 | Crayford | .................... 370/213 |
| 5,758,071 A | * | 5/1998 | Burgess et al. | .............. 709/220 |
| 6,049,528 A | * | 4/2000 | Hendel et al. | .............. 370/235 |
| 6,118,796 A | * | 9/2000 | Best et al. | ................... 370/524 |
| 6,128,729 A | * | 10/2000 | Kimball et al. | ................ 713/1 |
| 6,434,716 B1 | * | 8/2002 | Johnson et al. | ............. 714/712 |
| 6,754,173 B2 | * | 6/2004 | Wils et al. | ................... 370/217 |
| 6,760,761 B1 | * | 7/2004 | Sciacca | ....................... 709/220 |
| 6,879,588 B1 | * | 4/2005 | Malalur | ....................... 370/389 |
| 2002/0015387 A1 | * | 2/2002 | Houh | ......................... 370/250 |
| 2003/0161328 A1 | * | 8/2003 | Chase et al. | ........... 370/395.52 |
| 2003/0198247 A1 | * | 10/2003 | Gardner et al. | ............ 370/445 |

FOREIGN PATENT DOCUMENTS

| | | |
|---|---|---|
| EP | 0515253 A1 | 11/1992 |
| GB | 2350034 A | 11/2000 |

\* cited by examiner

*Primary Examiner*—Jason Cardone
*Assistant Examiner*—Tanim Hossain

(57) ABSTRACT

A method and program for checking for misconfigurations and inefficiencies in the configuration of devices and links on a network. Information relating to the configuration of components on the network is stored in a database. The configuration information is accessed for each device, and interrogated for each port and its associated link and connected remote port. The interrogation determines whether the ports and links have matched configuration and whether they are running at optimum capability, such as at full duplex (both ends permitting), at maximum speed or with maximum numbers of ports assigned to a trunk.

7 Claims, 6 Drawing Sheets

OPTIMISATION OF NETWORK CONFIGURATION

FIELD OF THE INVENTION

This invention relates to management of network configuration to identify misconfigurations and/or conditions inhibiting optimised performance.

BACKGROUND TO THE INVENTION

Networks generally consist of a number of devices which may include workstations, personal computers, servers, hubs, routers, bridges and switches linked together by physical cable or wireless links. The devices on the network operate in accordance with a protocol to enable recognition of communicating devices and control of the data or traffic between them. Networks may take various forms such as a local area network (LAN) or a wide area network (WAN). In most substantial sized networks some or all of the devices on the network are managed.

Achieving optimum performance from a network requires devices and links to be set to the best configuration. Mistakes may be made in the original setup and configuration or may arise during modification of an existing network. Presently it is possible to display configurations but the recognition of a non-optimised configuration and correction depends upon the skill of the network manager being able to notice the misconfiguration or lack of efficiency and know how to change the configuration to make the needed improvement.

In general, most network management applications have provided either individual device management or a collective blind display. With individual device management the network manager is required manually to check the configuration of each device on the network in turn and match it up with the configurations of other devices, in the hope of spotting potentially bad configurations. Display applications retrieve the network configuration from several devices and allow these to be displayed in order to enable the network manager to conduct a manual review and again, hopefully spot bad configurations.

Clearly both these methods rely heavily on the individual knowledge of the network manager and time consuming manual checking.

SUMMARY OF THE INVENTION

The present invention is directed towards providing a network configuration check that provides an indication of the nature of a misconfiguration or inefficiency and which may be automated.

A network and the devices on it are systematically analysed and compared in order to detect any inefficiencies or anomalies in their configuration relative to one another and/or otherwise, and these are displayed with query status indicated when a configuration does not conform to the predefined optimisation. An offer to reconfigure automatically to the optimum configuration and/or an indication of the change or changes required may also included. The analysis of the network may be an analysis of a compilation of information about the network and devices.

According to the present invention there is provided a method of checking configurations on a network, the method comprising the steps of for at least one managed device on the network, accessing configuration information for a port and its respective associated link to another device, applying a series of interrogations to the configuration information relating to an aspect of configuration to determine whether the port and associated link conforms to at least one predetermined configuration criterion, and when the configuration does not conform, providing an indication of the non conformity that has been determined.

The invention also provides a computer program comprising program instructions for accessing configuration information relating to a plurality of ports and respective associated links of a plurality of devices on a network and for applying a series of interrogations to the configuration information and for providing an indication when the sequence of responses to the interrogations indicates the aspect of configuration for a port or link does not conform to one of a set of predetermined criteria.

BRIEF DESCRIPTION OF THE DRAWINGS

The invention is now described by way of example with reference to the accompanying drawings in which—

DETAILED DESCRIPTION OF PREFERRED EMBODIMENTS

Figure 6:
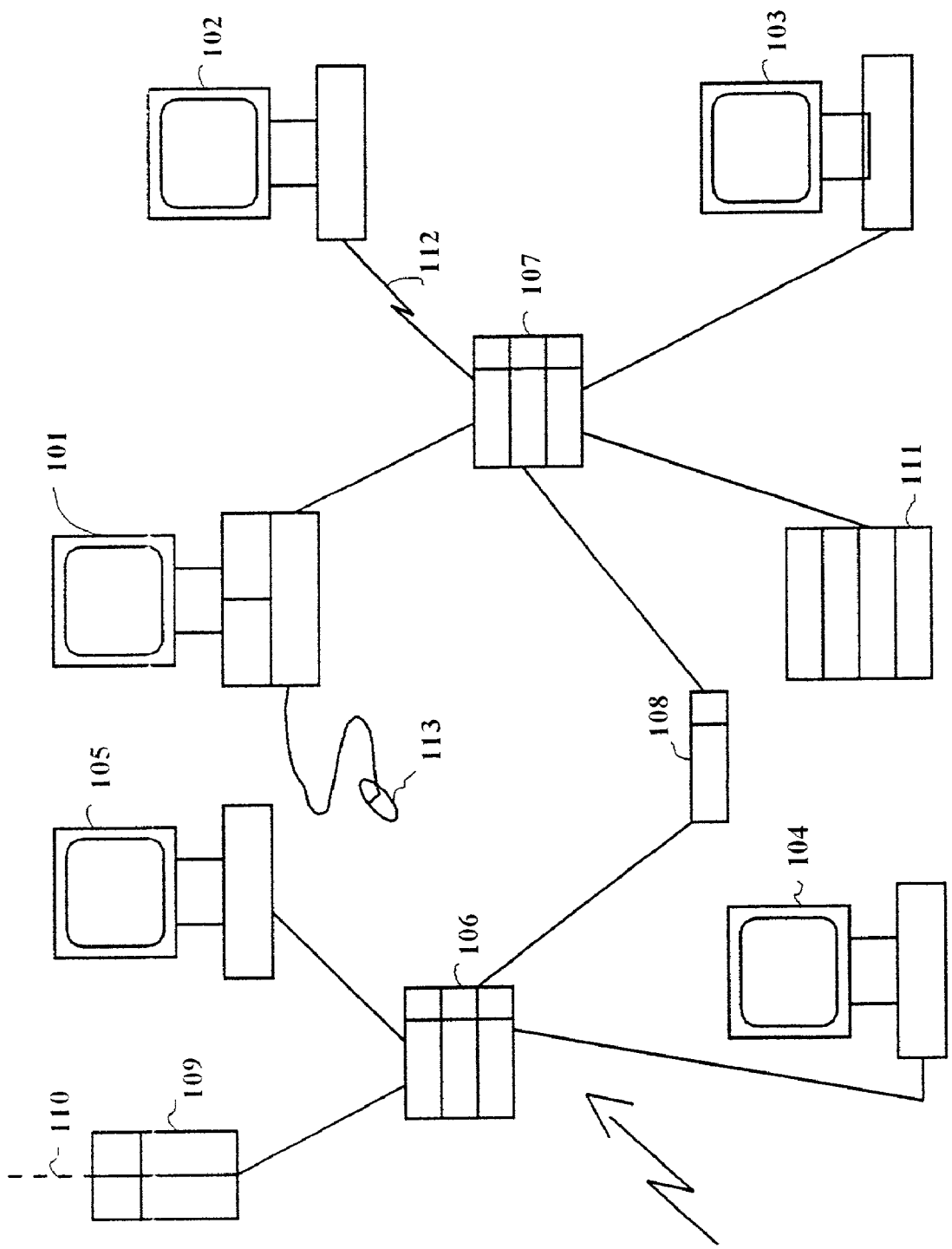
FIG. 6 is a schematic illustration of a network.

Referring first to FIG. 6 a network 100 has a network manager's workstation 101 and a plurality of other workstations 102, 103, 104 and 105, some of which may be managed and some may be PCs. In the network shown there are two hubs 106 and 107 and a switch 108. Device 109 links onward to other devices or another network via link 110. A large storage server is shown as device 111, but it could be replaced by any other kind of device or a storage subnet.

The links between the workstations, hubs and other devices are generally cable links, but may also be wireless as indicated by link 112. It will be appreciated that more complex networks frequently exist and other arrangements including loops may also be present. Temporary connection to the network may be made via interfaces such as the internet.

The process of the present invention may be initiated by the network manager or, in some circumstances, may be initiated automatically by the management program based on a set of predetermined rules. The management program that implements the process may be executed on a separate computer that connects to the network for the purpose or incorporated into one or more of the networked devices themselves. In other cases the process may be invoked remotely but the process itself run on a computer linked to the network, or the information about the network harvested and examined remotely. The process is based on checking, in turn, the devices on a network and applying an analysis based on a set of rules to determine whether the configurations can be improved. The rules depend upon the specific areas or features for which the configuration is being analysed and in general these fall into four categories duplex mode, trunks, link speed and resilient links.

Figure 1:
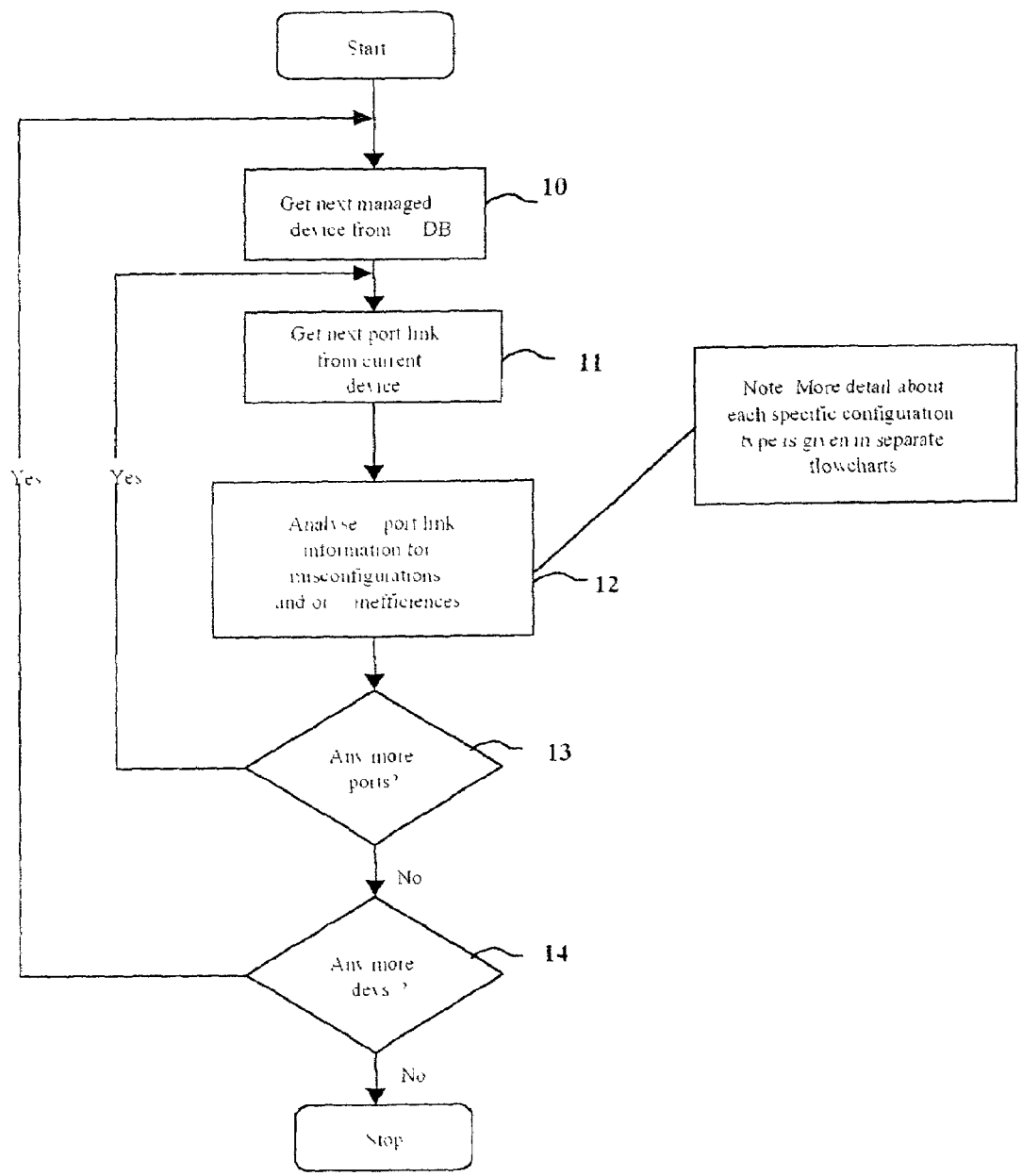
FIG. 1 is a flow diagram of an overview of a configuration check according to the invention.

FIG. 1 shows schematically the procedure that can be applied for each set of rules. The configuration information of the network is obtained and stored in a predefined accessible format, such as in a database. This step is similar to prior art procedures which obtain and display the information for manual action. This collection and storage step is represented by boxes 1 and 2 of FIG. 1 and is generally presumed to take place before instigation of the analysis procedure.

Once the procedure is started, the first step, represented by box 10, is to fetch the configuration information of the first device from the database. This is then followed by, shown in box 11, fetching the first port or link information and supplying this to the rules or analysis stage shown as box 12. Further details of the rules options for box 12 are shown and discussed later with reference to FIGS. 2 to 5.

Once the rules have been checked for the port or link under consideration, the system checks (box 13) whether there is another port or link that has not yet been analysed belonging to the device under consideration. If there is another port or link, the process loops back to box 11 and the next port or link becomes the one for analysis in box 12.

Once all the ports or links for a device have been analysed the system checks (box 14) whether there is another device not yet checked and if so the process loops back to box 10 and the next device not yet checked becomes the device under consideration and each of its ports or links is subjected to the tests in turn. The results of the tests are used to signify if a configuration change is desirable and where appropriate to offer to make the change.

Figure 2:
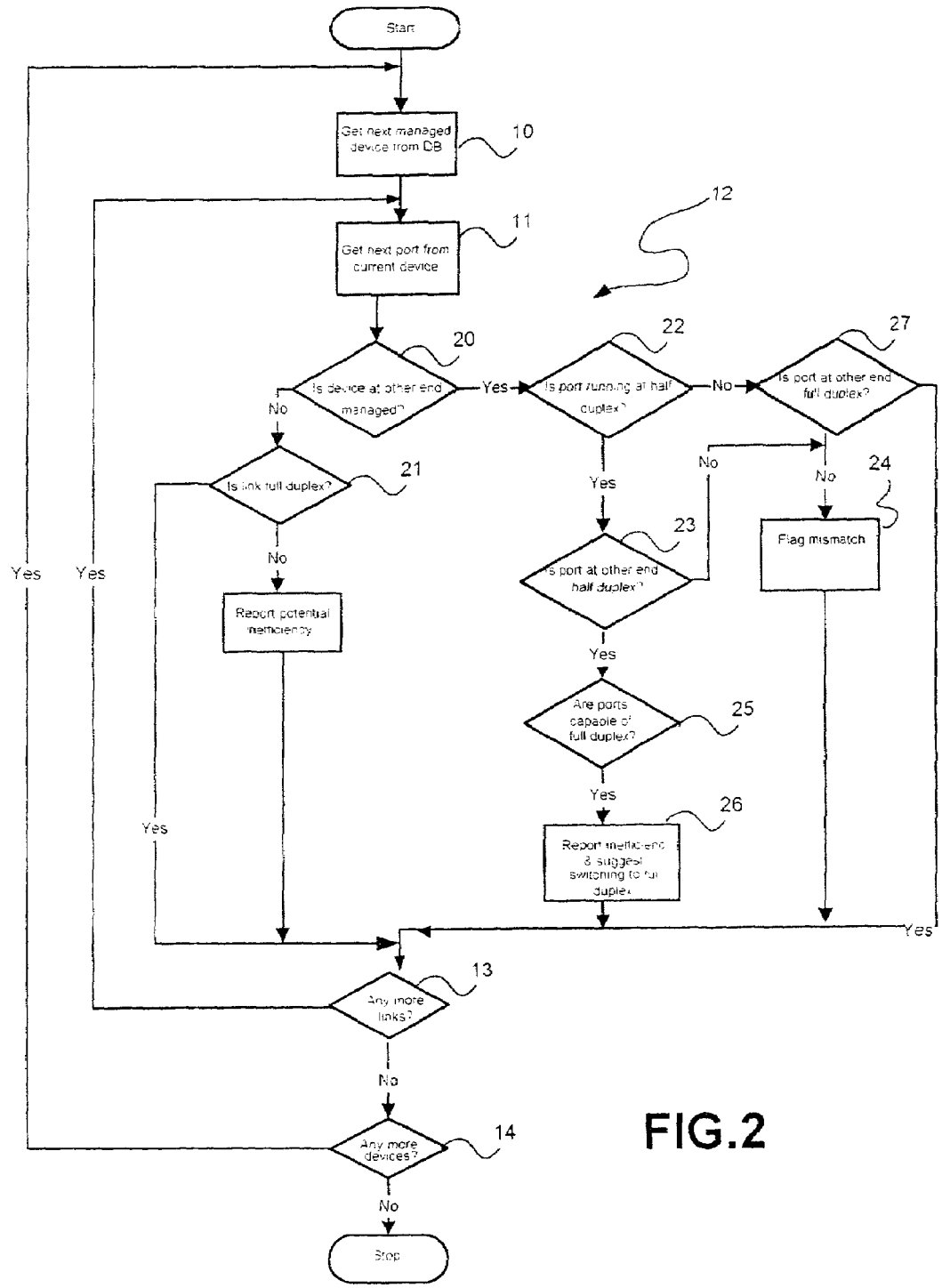
FIG. 2 is a flow diagram showing a duplex mode configuration check.

Referring now to FIG. 2 the system is shown with box 12 expanded to include the rules for checking for duplex mode configuration. The preliminary collection and storage of the configuration information is omitted from this and subsequent Figures relating to the more detailed analysis procedures.

In order for two devices to communicate properly without data collisions, the duplex mode configured at each end of the link connecting them must match. In the duplex mode analysis the duplex mode at both ends of all links for which network configuration information is available in the database are checked and mismatches or inefficiencies are flagged.

The following checks are made—
1 That the mode of operation is consistent at each end of the link (mismatch check)
2 That all links connected to ports capable of full duplex communication are configured for full duplex (efficiency check)

Referring in more detail to FIG. 2, the following sequences of interrogation take place.

The step signified by box 20 ascertains whether the device at the other end of the link under consideration is managed. If the device is not managed, a check is made to see if the link is running on full duplex (box 21). If it is, this is correct, and no action is flagged. If the link is not full duplex there could be an inefficiency but this is not certain because when one end is not a managed node, for example if it is a PC, then the capabilities of the node can not be determined. In this instance it is useful to flag up to the user that the link is running at half duplex so there may be an inefficiency to be checked. However, this flag can indicate this is a low priority check as there are likely to be more instances where half duplex is correct.

When the device at the other end is managed, the ports rather than the link is checked. In the step indicated by box 22, the port under consideration is checked for half or full duplex. If it is half duplex at box 23 it is checked whether the port at the other end is half duplex. If the answer is NO, a mismatch is flagged by box 24. If the answer is YES, the step at box 25 checks for efficiency by investigating whether both of the ports are capable of full duplex. A YES response here results in generation of an inefficiency report shown by box 26, that suggests switching to full duplex. If one or other port is not capable of full duplex then the configuration is correct and no report is triggered.

If at box 22 it is determined that the port under consideration is running full duplex, the step at box 27 checks whether the port at the other end is full duplex. YES indicates all is well but NO flags a mismatch at box 24.

Duplex mode checking is worthwhile even though many newer devices include an auto-negotiation feature as incompatibility of the auto-negotiation with many of the PHYs on older devices does occur.

When a system is mismatched with one port configured to run at half duplex and the other at full duplex the link will pass some traffic, but there will be collisions.

Figure 3:
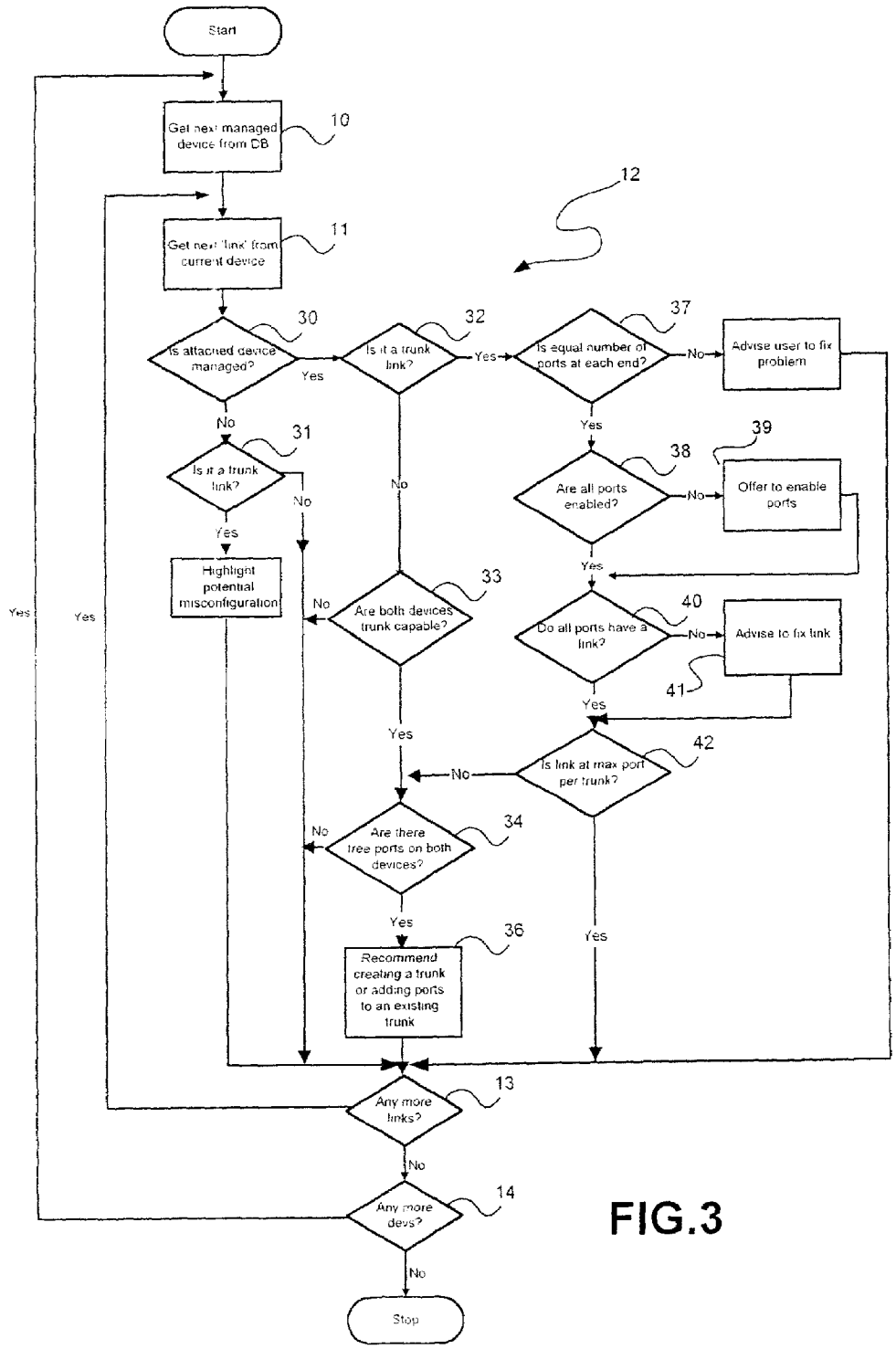
FIG. 3 is a flow diagram showing a trunk link configuration check.

FIG. 3 shows the system with box 12 expanded to include the rules for trunk link analysis.

A trunk link is a way of increasing the available bandwidth between two devices. In a trunk link, ports are grouped together and specified to be part of a trunk. The ports that are part of the trunk must all be connected to the same device at the other end of their link and the corresponding connected ports at the device at the other end must also be specified as part of a trunk.

To check for correct configuration and efficient operation the system interrogates each device to determine the trunks that have been created and the ports that are assigned to the trunks. The basic rules for the interrogation are—
1. Each port in the trunk should be enabled This is because a device linked by a trunk will still attempt to send data to a port designated as part of the trunk at the other end, even if that port is disabled. The result would be that some traffic should get through the trunk to the enabled ports but that destined for the disabled port would be lost.
2. There must be an equal number of ports in the trunk at each end of the link If this is not the case, network performance may be seriously affected.
3. Each port in the trunk should have a valid link.

If a link that is part of a trunk is broken then the trunk is able to adapt since each end detects that the link is lost, but the trunk is no longer operating at full capacity.
4. Look for devices that are connected together which have unused ports.

Use of these ports and creation of a trunk or incorporating them to increase the capacity of an existing trunk may improve the bandwidth and resilience of the connection between the two devices.

Referring now in more detail to FIG. 3, the following sequences of interrogation takes place.

The step signified by box 11 looks at links (rather than ports as in FIG. 2) and the step at box 30, similarly to box 20 of FIG. 3, ascertains whether the device at the other end is managed. If the device is not managed a check is made to see whether it is a trunk link (box 31). If it is not a trunk, no action is flagged. If it is a trunk there may be a potential misconfiguration and this is reported.

When the device at the other end is managed the step at box 32 determines whether or not it is a trunk link. If it is not a trunk link, the box 33 step determines whether both devices are trunk capable. If both are not, the trunk link configuration is acceptable and nothing is flagged. If both devices are trunk capable, the step of box 34 determines whether there are free ports available on both devices and if there are not, then again the configuration is accepted. However if there are free ports, box 36 flags a recommendation to create a trunk or to add the ports to an existing trunk.

If at the box 32 step the response is that the link is a trunk, then at box 37 it is determined whether there are equal numbers of ports at each end, and if there are not equal numbers an advisory notice is flagged to the user to equalise the ports. When the port numbers are equal, the step at box 38 ascertains whether all ports are enabled and if they are not offers to enable the ports (box 39). If the ports are all enabled, including after the box 39 step, at box 40 it is checked whether all the ports have a link, and if thee do not, flags an advice to the user to fix the link (box 41). If all ports have a link, and also after the advice of box 41, there is a check at box 42 whether the link is at the maximum number of ports per trunk. When the response to this is NO, the box 34 enquiry about free ports is made and the sequence continues as described above for boxes 34 and 36, although it will be appreciated that any flagging that has occurred at boxes 39 and 41 remains. Finally, if the link is at maximum ports per trunk, that step of the configuration is accepted but again any box 39 and box 41 flagging remains.

Figure 4:
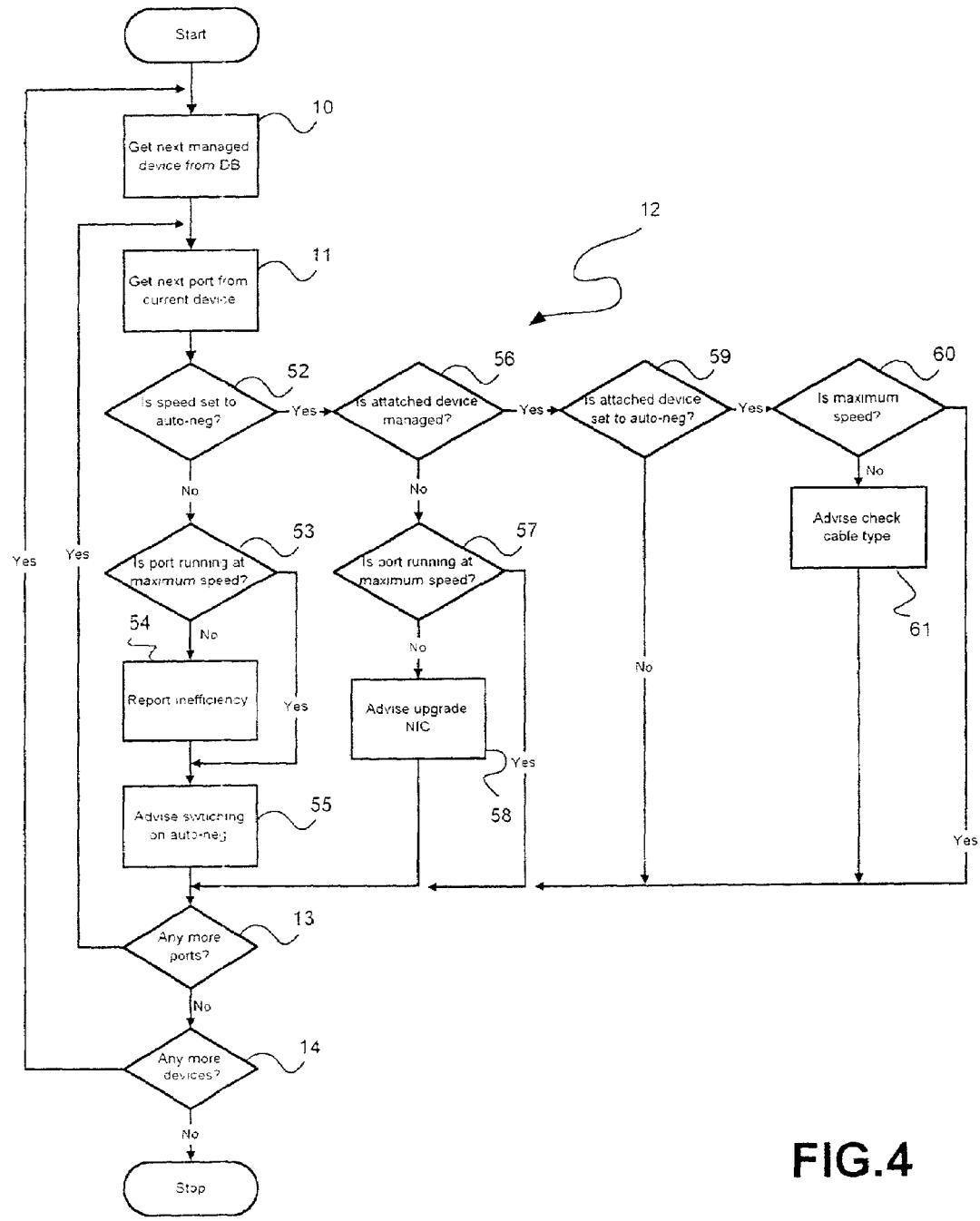
FIG. 4 is a flow diagram showing a link speed configuration check.

Referring now to FIG. 4, box 12 is shown expanded to incorporate a link speed analysis For two devices to communicate with each other, the speed configured at both ends of the link connecting them must match. With newer devices auto-negotiation of the best speed is often available, but it is also possible for a user to switch off auto-negotiation and force a given speed. In the event that the ports are set to communicate at different speeds, then traffic will not pass between them and consequently the network management system will be unable to communicate with one of them. However, it is possible to detect that the link is not running at optimum speed.

The potential scenarios for link speed checking are
1. Auto-negotiation is switched on at both ends of the link but the link is not running at maximum speed.

For this to be detected, both ends of the link need to be managed. The lack of optimum speed in such instances can arise if the cable used to interconnect devices is inferior to that required. For example gigabit per second communication may drop to 100 mega bits per second. When low link speed is detected, an advice to check the cable type is flagged.
2. A port has been explicitly set to run at a speed less than its maximum capability.

This may be the situation if the user has inadvertently configured a port into a fixed speed An advice to switch on auto-negotiation can be flagged.
3. A port has been explicitly set to run at a given speed, but is currently running at its most optimum speed.

This is a variant of the previous situation, and may arise if the device at the other end of the link has been replaced and the fixed speed may no longer work. Switching on auto-negotiation is again advised.
4. A port is in auto-negotiation mode but is not running at its fastest speed.

This is most likely where the device at the other end of the link is unmanaged, for example a PC. This is not an error or inefficiency of the installed hardware, but is indicative that the device is not making best use of its capability. An advice can be given to upgrade the network card of the PC in order to optimise conditions.

Referring now to FIG. 4, the following sequences of interrogation take place.

The step of box 10 fetches the next port from the device under consideration. At box 52 it is determined whether the speed is set to auto-negotiation and if it is not, at box 53 it is queried whether the port is running at maximum speed. If the port is not running at maximum speed an inefficiency report is flagged (box 54) and then both for ports running at maximum speed and also for those with inefficiency flagged the step at box 55 flags an advice to switch on auto-negotiation.

If at box 52 it is established that the speed is set to auto-negotiation, the step at box 56 ascertains whether the device at the other end of the link is managed. If the device is not managed, the box 57 step determines whether the port is running at maximum speed. If it is, no action is flagged, but if it is not box 58 flags up an advice to upgrade the network card of the attached device.

When the box 56 step determines that the attached device is managed, box 59 determines whether the attached device is set to auto-negotiation. If it is not, no action is flagged (It is assumed that any inefficiency will be detected at the managed end as with steps 52 to 55). If the box 59 step determines that the attached device is set to auto-negotiation, box 60 checks whether the port is at maximum speed, and if it is no action is required. If the speed is not at a maximum, box 61 flags up an advice to check the cable type.

Figure 5:
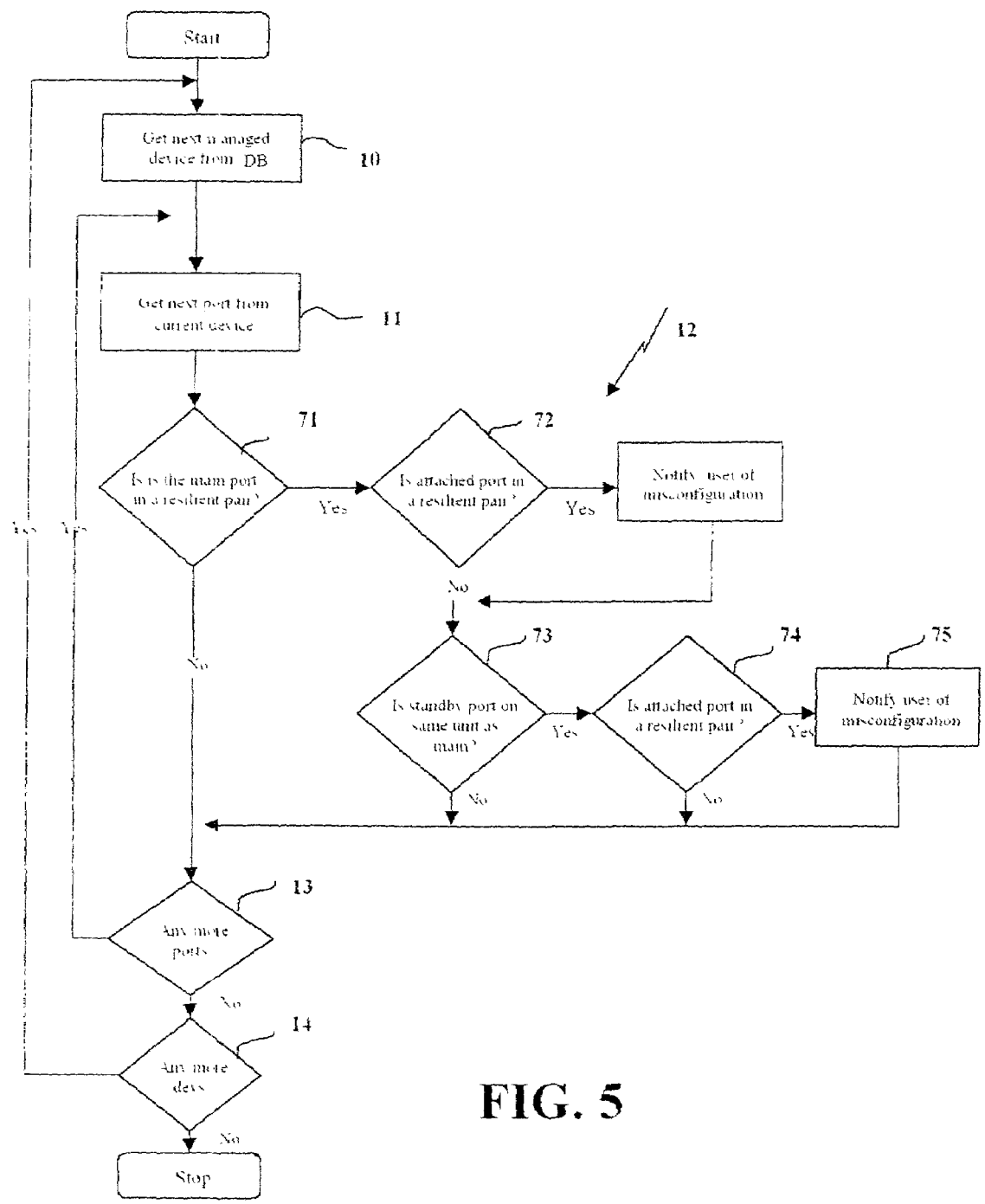
FIG. 5 is a flow diagram showing a resilient link configuration check.

FIG. 5 illustrates the system with box 1 expanded to include the rules for analysing resilient links.

A resilient link (or resilient pair) is manual configuration of two ports on a given device where the two ports are specified as forming the resilient pair. The two ports are linked at then other end to the same device. One of the ports in the resilient links is specified as the main port and is active for forwarding traffic. The other port is designated as a standby and becomes inactive, but becomes active in the event of failure of the link on the main port. Thus a degree of resilience against link failure is achieved.

The rules for checking resilient links are
1. Check for resilience being configured at both ends of the link When configuring resilient links it is usual practice to specify resilience only at one end of the link, it being the job of the resilient pair to determine when to switch to the standby port. If both ends are specified as resilient links a failure of a link would result in both ends trying to resolve the problem by switching to their associated standby link, which could subsequently result in a conflict elsewhere in the network. This check is not strictly for a misconfiguration but for a lack of understanding of resilient links.

At present this check can only be made with the main link because, with current technology, it is not possible to determine where the other end of a standby link is connected. However with information from devices becoming more comprehensive this should become possible in the future. (This may also be applicable to other procedures and to implementation of automated correction for this and other procedures).
2. Check for main and standby port on same unit of device Both ports that are configured to form a resilient pair can belong to the same unit of the device. Stackable devices can have multiple units and if both the ports in the resilient pair are connected to the same unit, failure of the unit cuts off both ports. However, if the standby port is on a different unit there is greater resilience to unit failure. Advice to move the standby port to another unit can be provided.

FIG. 5 shows the system with box 12 expanded to show resilient link analysis.

As before, the box 11 step references the next port of device under consideration. At box 71 it is determined whether or not the port is a main port of a resilient pair and if it is not the system proceeds to the next port or device as the case may be via boxes 13 or 14. In future standby port checks could be inserted before box 13 in this flow chart.

When the port is determined to be the main port of a resilient pair, the step at box 72 determines whether the attached port is in a resilient pair. If the attached port is also designated part of a resilient pair this undesirable configuration is flagged up. Then, in all cases, at box 73 it is determined whether the standby port is on the same unit as the main port. If it is not, the procedure joins the next port/device stage, if it is on the same unit the step at box 74 ascertains whether the device is stackable. If it is not, the procedure joins the next port device stage, whereas if the device is stackable box 75 flags the advice to move the standby port to another device before continuing to the next port/device stage.

The procedure may be initiated to check for example, just duplex mode or a check for several or all of the configuration aspects may be made. When checks on more than one aspect of configuration are made these may be done in series, that is, for example, completing the procedure shown in FIG. 2 and then restarting on the procedure of FIG. 3, or the procedure for the different aspects may be checked out at each device/port stage, that is moving from the box 12 step of FIG. 2 to the box 12 step of FIG. 3 and so on before proceeding to box 13.

When the process is run on a computer connected to the network, the mismatches and actual or possible inefficiencies are specifically displayed for the network manager. The display indicates the configuration status that has been determined together with the changes required or suggested. An option to make the change is offered (when that is possible) which may be selected by the manager for example via mouse 113 (FIG. 6) or a keyboard command. When automated change is not possible or the non-optimised condition is not certain due to lack of information the change option may be replaced by an option to send a message that notifies the relevant operators, managers or devices of criteria that might require changing, checking or upgrading to achieve optimum performance. The message may be sent by e-mail or pager and include an inhibit to prevent excessive repeated sending.

When the process is run on a remote basis, the indications may be displayed at the remote location and/or results returned from the remote interrogations for action by the network manager or the indications may be directed to the relevant managed devices.

The program may be provided on suitable carriers in software or in a combination of software and firmware or distributed in the form of signals.

In some instances, especially for complex networks, specific areas or links within the network may be checked or a priority order assigned to the order of the checks. An option to include only managed devices may be provided. The procedure could also be implemented on an automatic basis at routine intervals.

The invention claimed is:

1. A method of remote monitoring comprising:
accessing a database including retrieved configuration information for each port of each of a plurality of managed devices on a computer network and for each of a plurality of respective associated links to a respective other device, said configuration information indicating for said each port and said respective other device a respective duplex state and data transmission speed;
applying a series of interrogations to the database including the configuration information to determine whether said each port and associated link conform to at least one predetermined configuration criterion for each of said duplex state and data transmission speed;
and when the configuration of said each port and associated link does not conform to said at least one predetermined configuration criterion, providing an indication of the non conformity that has been determined.

2. A method as in claim 1 in which the interrogations determine whether said each port and a port at the other end of said associated link are running the same duplex mode.

3. A method as in claim 2 in which the interrogations determine whether ports at both ends of said associated link are capable of full duplex operation.

4. A method as in claim 1 in which said respective other device is a managed device and said series of interrogations determine (a) whether said associated link is a trunk link, and (b) whether each port in said trunk link is enabled.

5. A method as in claim 1 in which the interrogations determine whether auto-negotiation is switched on at both ends of the link.

6. A method as in claim 5 in which the interrogations determine whether said each port has been set to run at a fixed speed less than its maximum capability with auto-negotiation.

7. A digital data storage medium having stored therein a computer program comprising program instructions for causing a computer to perform the method of claim 1.

* * * * *